United States Patent [19]

Holzapfel et al.

[11] 4,216,124

[45] Aug. 5, 1980

[54] MATERIAL FOR THE CONSTRUCTION OF EXOELECTRON DETECTORS

[75] Inventors: Georg Holzapfel, Berlin, Fed. Rep. of Germany; Maurice Petel, Bourg la Reine, France

[73] Assignee: Commissariat a l'Energie Atomique, Paris, France

[21] Appl. No.: 833,984

[22] Filed: Sep. 16, 1977

[30] Foreign Application Priority Data

Sep. 17, 1976 [FR] France .................... 76 27983

[51] Int. Cl.$^2$ .................... H01B 1/06; H01B 1/08
[52] U.S. Cl. .................... 252/518; 252/521; 250/337; 250/484
[58] Field of Search ........ 252/501, 518, 521, 301.4 R, 252/301.4 S, 301.4 H; 250/337, 484

[56] References Cited

U.S. PATENT DOCUMENTS

| | | | |
|---|---|---|---|
| 3,484,610 | 12/1969 | Becker | 250/484 X |
| 3,577,161 | 5/1971 | Oberhofer et al. | 252/301.4 H X |
| 3,600,579 | 8/1971 | Carpentier et al. | 252/301.4 H X |
| 3,637,518 | 1/1972 | Nada et al. | 250/484 X |
| 3,792,282 | 2/1974 | Braunlich | 250/484 X |

OTHER PUBLICATIONS

Holzapfel, G. et al., Chemical Abstracts 81 (1974), 57379g, "Exoelectronic Properties of Aluminum Oxide Solids".

Holzapfel, G. et al., Nuclear Science Abstracts, Sep. 15, 1975, 11581.

Holzapfel, G. et al., Chemical Abstracts 83 (1975), 49867r, "Dosimeter Properties of Alumina Using Exoelectrons".

*Primary Examiner*—E. Suzanne Parr
*Attorney, Agent, or Firm*—Kerkam, Stowell, Kondracki & Clarke

[57] ABSTRACT

The sensitive plate of a dosimeter for the measurement of radiation by emission of exoelectrons is formed of material consisting of a mixture of a first substance containing traps for the electrons and capable of emitting exoelectrons by thermal or optical stimulation and a second substance which has good ionic conductivity and is capable of producing material having high mechanical strength.

3 Claims, No Drawings

MATERIAL FOR THE CONSTRUCTION OF EXOELECTRON DETECTORS

This invention relates to a material for the construction of exoelectron detectors.

The basic concept of an exoelectric detector will first be explained in order to gain an understanding of the principle involved. It is known that, when a small plate formed of certain crystalline materials is subjected to irradiation, its electrons are transferred from the valence band to the conduction band of the crystal lattice. A certain proportion of these electrons is captured in the traps of the crystal lattice, these traps being present either as a result of impurities of the crystal or as a result of other defects of the lattice. In order to release the electrons from these traps, energy must be supplied to the crystal lattice. This supply of energy or so-called stimulation process can be of either optical or thermal origin. By measuring the quantity of electrons which are thus released and which will hereafter be designated as exoelectrons, it is possible to deduce therefrom the radiation dose previously absorbed by the sample. The electrons released by the crystal during the stimulaton process are detected and measured by means of an exoelectron reader at the time of the phenomenon of stimulated exoelectron emission. Emission of exoelectrons is measured, for example, by means of a gas-flow Geiger counter or else a windowless electron multiplier.

The present invention relates to the manufacture of material which forms the sensitive plate of an instrument for determining a radiation dose by emission of exoelectrons, this instrument being designated as a dosimeter in the following description.

The only materials which are suitable for the purpose of fabricating the sensitive plate of the dosimeter are the insulating materials. For example, aluminum oxide or beryllium oxide make it possible to obtain electron "storage" times of sufficient duration and their use in the construction of devices for measurement by exoelectrons is well-known. However, difficulties are encountered in connection with linearity of response (exoelectron emission) as a function of the radiation dose. These difficulties arise from the formation of an uncontrolled electric charge in the material which constitutes the dosimeter and especially the deposition of ions produced by the gas discharge within the counter.

One known method of overcoming this disadvantage consists in mixing the microcrystalline emitter material (containing electron traps) with a finely dispersed electrically conductive material such as graphite, for example. This makes it possible to obtain microscopic conductivity of the material which constitutes the sensitive plate of the dosimeter. In practice, however, material which ensures the production of a strong and rugged plate cannot be obtained from a mixture of powders of this type by means of known processes such as compacting or sintering of the starting material. It has also been endeavored to deposit thin metallic films (of gold, for example) in varying thicknesses on beryllium oxide ceramics. This method is not conclusive, however, and the same applies to the introduction of lithium metal by diffusion.

The present invention is precisely directed to a material which serves as a sensitive plate for the measurement of radiations by exoelectron emission which overcomes the disadvantage mentioned in the foregoing while effectively preventing the appearance of these parasitic charges and ensuring that a plate having acceptable properties of strength and resistance is in fact obtained.

The material in accordance with the invention which makes it possible to achieve this result consists of a mixture of exoelectron-emitter material containing traps for the electrons and an ion-conducting material.

Preferably, the exoemitter material is selected from alumina which crystallizes in the $\alpha$ phase or beryllium oxide and the ion-conducting and non-exoemitter material is alumina which crystallizes in the $\beta$ phase.

As mentioned earlier, the invention consists in preparing a material from a mixture which is constituted on the one hand by a compound containing traps for the electrons produced by irradiation of the material (this compound can accordingly be designated as an exoelectron emitter) and by a compound which exhibits ionic conduction in order to obtain uniform distribution of the field at the moment of exoemission and which does not exhibit electronic conduction in order to ensure that the trapped charges are not removed. Moreover, this second compound is chosen so as to ensure that, when mixed with the first substance, a high-strength plate of this mixture can accordingly be formed by simple means. It has been discovered that the second compound mentioned above could also consist of alumina ($Al_2O_3$) but which has crystallized in the $\beta$ phase. The very important advantage of this type of alumina lies in the fact that it has excellent ionic conductivity by virtue of the presence of sodium $Na^+$ ions. A further advantage lies in the fact that the alumina is not itself an exoemitter. Furthermore, the mixture of $\alpha$ $Al_2O_3$ and $\beta$ $Al_2O_3$ has a sensitivity for this type of device which is considerably higher than the mixture of $\alpha$ $Al_2O_3$ and graphite which had hitherto been employed. It is recalled that the sensitivity is the ratio of the number of exoelectrons emitted after the stimulation phase to the product of the surface area of the exoemitter material multiplied by the radiation dose received by the sensitive plate.

A further advantage of the $\alpha$ $Al_2O_3$–$\beta$ $Al_2O_3$ mixture at the level of fabrication and utilization of the sensitive plate lies in the fact that these two substances have the same density. The procedure which is usually adopted in order to obtain the sensitive plate consists in compacting the mixture under a pressure of a few tons, then carrying out a thermal annealing operation at a temperature within the range of 1500° to 1700° C. The use of this mixture offers yet another advantage in that this latter can be sintered in air whereas the conventional mixture of $\alpha$ $Al_2O_3$ and graphite cannot be sintered in air since the mixture burns at a temperature below 1000° C.

Moreover, the type of $\alpha$ $Al_2O_3$ employed makes it possible to perform the measurement at high temperature. Thus the thermostimulation peak of this alumina is localized at 500° C., is stable and not subject to problems of fading.

It is also possible in practice to make use of silver, potassium, lithium, rubidium or cesium ions or even magnesium ions instead of the sodium ions in the $\beta$ $Al_2O_3$ compound. In fact, in contrast to the ions which constitute impurities, the ions of the crystal lattice, namely Al and O, are practically motionless. It is worthy of note, however, that the following substances: $SO_4Ca$, $SO_4Ba$, $CaF_2$, $SO_4Sr$ or $FLi$ can also be employed as first constituent (exoemitter constituent).

It is readily apparent that, for the construction of a measuring instrument which utilizes the exoemitter effect by either thermal or optical excitation and stimulation, the active plate can be fabricated on a mechanical support. This support can clearly be an insulator but can also be formed of material having ionic conductivity as has already been clearly brought out in the foregoing description.

By virtue of this particular mode of construction of the sensitive plate of the device for measurement by emission of exoelectrons (or dosimeter), these devices can be employed in composite radiation fields (neutrons, gammaradiations) at high temperatures whereas this was not possible in the case of materials of the prior art.

It is also readily apparent that the invention is concerned not only with the composition required for the manufacture of the plate but also with the sensitive dosimeter plate obtained by means of the methods and compositions described in the foregoing.

One composition which can be mentioned by way of example is that of a material containing 50% $\alpha$ $Al_2O_3$ and $\beta$ $Al_2O_3$. The detector thus obtained has a sensitivity of 6500 exoelectrons/Rad/cm$^2$.

What we claim is:

1. Material for forming the sensitive plate of a device for the measurement of radiations by emission of exoelectrons, said material being a mixture of a first substance selected from the group consisting of alumina, beryllium oxide, $CaSO_4$, $BaSO_4$, $CaF_2$, $SrSO_4$, and LiF containing traps for the electrons and emitting exoelectrons by thermal and also optical stimulation and a second substance of alumina crystalized in the $\beta$ phase, said material having high mechanical strength.

2. Material for forming the sensitive plate of a device for the measurement of radiations by emission of exoelectrons, said material being a mixture of a first substance containing traps for the electrons and emitting exoelectrons by thermal and also optical stimulation and selected from the group consisting of Ca $SO_4$, Ba $SO_4$, $CaF_2$, Sr $So_4$ and Li F, and a second substance of good ionic conductivity and no electronic conduction consisting of alumina crystallized in the $\beta$ phase.

3. Material for forming the sensitive plate of a device for the measurement of radiations by emission of exoelectrons, said material being a mixture of a first substance containing traps for the electrons and emitting exoelectrons by thermal and also optical stimulation and selected from the group consisting of $\alpha$ alumina, and beryllium oxyde, and a second substance of good ionic conductivity and no electronic conduction consisting of alumina chrystallized in the $\beta$ phase.

* * * * *